(12) United States Patent
Cordeiro et al.

(10) Patent No.: US 12,071,150 B2
(45) Date of Patent: Aug. 27, 2024

(54) VEHICULAR DRIVING ASSIST SYSTEM USING FORWARD VIEWING CAMERA

(71) Applicant: Magna Electronics Inc., Auburn Hills, MI (US)

(72) Inventors: Alan M. Cordeiro, Farmington Hills, MI (US); Tejas Murlidhar Varunjikar, Troy, MI (US); Mayank Hitesh Desai, Novi, MI (US); Chang Wang, Novi, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 279 days.

(21) Appl. No.: 17/808,386

(22) Filed: Jun. 23, 2022

(65) Prior Publication Data
US 2022/0410916 A1    Dec. 29, 2022

Related U.S. Application Data

(60) Provisional application No. 63/202,806, filed on Jun. 25, 2021.

(51) Int. Cl.
*B60W 50/08* (2020.01)
*B60R 11/00* (2006.01)
(Continued)

(52) U.S. Cl.
CPC ........... *B60W 50/082* (2013.01); *B60R 11/04* (2013.01); *B60W 50/0205* (2013.01);
(Continued)

(58) Field of Classification Search
CPC ........... B60W 50/082; B60W 50/0205; B60W 50/14; B60W 2050/0215;
(Continued)

(56) References Cited

U.S. PATENT DOCUMENTS

| 5,550,677 A | 8/1996 | Schofield et al. |
| 5,670,935 A | 9/1997 | Schofield et al. |

(Continued)

FOREIGN PATENT DOCUMENTS

| EP | 3257729 A1 * | 12/2017 | ........... B60R 16/023 |
| JP | 2020064402 A * | 4/2020 | ............ B60K 35/00 |

OTHER PUBLICATIONS

English translation of Krishna et al. (EP 3257729) (Year: 2017).*
English translation of Ono et al. (JP 2020064402) (Year: 2020).*

*Primary Examiner* — James M McPherson
*Assistant Examiner* — Kyle J Kingsland
(74) *Attorney, Agent, or Firm* — HONIGMAN LLP

(57) ABSTRACT

A driving assistance system includes a front camera module (FCM). The system, responsive to processing captured image data from the FCM, generates FCM control signals. The system includes a plurality of vehicle sensors capturing sensor data and an advanced driving-assistance system (ADAS) controller. The ADAS controller, responsive to processing the sensor data, generates ADAS control signals. The ADAS controller generates an ADAS status signal indicating a reliability of the generated ADAS control signals. With the ADAS status signal indicating the reliability of the generated ADAS control signals is at or above a threshold ADAS reliability level, the system controls the vehicle using the ADAS control signal and, responsive to determining that the ADAS status signal indicates that the reliability of the generated ADAS control signals is below the threshold, switches from controlling the vehicle based on the ADAS control signals to controlling the vehicle based on the FCM control signals.

22 Claims, 6 Drawing Sheets

(51) Int. Cl.
*B60R 11/04* (2006.01)
*B60W 50/02* (2012.01)
*B60W 50/14* (2020.01)
*G06V 20/56* (2022.01)

(52) U.S. Cl.
CPC ........... *B60W 50/14* (2013.01); *G06V 20/588* (2022.01); *B60R 2011/0026* (2013.01); *B60W 2050/0215* (2013.01); *B60W 2420/403* (2013.01); *B60W 2552/53* (2020.02); *B60W 2710/20* (2013.01); *B60W 2720/106* (2013.01)

(58) Field of Classification Search
CPC ....... B60W 2420/403; B60W 2552/53; B60W 2710/20; B60W 2720/106; B60W 10/20; B60W 2556/20; B60W 2050/0094; B60W 2720/10; B60R 11/04; B60R 2011/0026; G06V 20/588
See application file for complete search history.

(56) References Cited

U.S. PATENT DOCUMENTS

| | | |
|---|---|---|
| 5,949,331 A | 9/1999 | Schofield et al. |
| 6,690,268 B2 | 2/2004 | Schofield et al. |
| 6,824,281 B2 | 11/2004 | Schofield et al. |
| 7,038,577 B2 | 5/2006 | Pawlicki et al. |
| 7,480,149 B2 | 1/2009 | DeWard et al. |
| 7,720,580 B2 | 5/2010 | Higgins-Luthman |
| 7,855,755 B2 | 12/2010 | Weller et al. |
| 8,256,821 B2 | 9/2012 | Lawlor et al. |
| 9,487,159 B2 | 11/2016 | Achenbach |
| 9,596,387 B2 | 3/2017 | Achenbach et al. |
| 9,871,971 B2 | 1/2018 | Wang et al. |
| 9,896,039 B2 | 2/2018 | Achenbach et al. |
| 10,071,687 B2 | 9/2018 | Ihlenburg et al. |
| 10,099,614 B2 | 10/2018 | Diessner |
| 10,315,651 B2 | 6/2019 | Fiaschetti et al. |
| 2009/0295181 A1 | 12/2009 | Lawlor et al. |
| 2014/0160284 A1 | 6/2014 | Achenbach et al. |
| 2014/0226012 A1 | 8/2014 | Achenbach |
| 2015/0015713 A1 | 1/2015 | Wang et al. |
| 2015/0327398 A1 | 11/2015 | Achenbach et al. |
| 2019/0073541 A1* | 3/2019 | Koravadi ............. G06V 20/588 |
| 2019/0315363 A1* | 10/2019 | Kim ..................... B60W 40/06 |
| 2020/0039447 A1 | 2/2020 | Winden |
| 2021/0354637 A1* | 11/2021 | Hwang ................ H04N 23/661 |
| 2022/0363250 A1 | 11/2022 | Varunjikar et al. |

* cited by examiner

VEHICULAR DRIVING ASSIST SYSTEM USING FORWARD VIEWING CAMERA

CROSS REFERENCE TO RELATED APPLICATION

The present application claims the filing benefits of U.S. provisional application Ser. No. 63/202,806, filed Jun. 25, 2021, which is hereby incorporated herein by reference in its entirety.

FIELD OF THE INVENTION

Implementations herein generally relate to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

A driving assistance system or vision system or imaging system for a vehicle includes a front camera module (FCM) with a camera disposed at a vehicle equipped with the vehicular driving assistance system. The FCM is disposed behind the windshield of the vehicle and views forward of the vehicle through the windshield. The camera captures image data. The vehicular driving assistance system includes an image processor for processing image data captured by the camera to detect presence of objects in the field of view of the camera and to determine traffic lane marking information along a road ahead of the vehicle. The vehicular driving assistance system, responsive to processing the captured image data, generates FCM control signals for the vehicle. The FCM control signals include at least one selected from the group consisting of (i) lateral movement commands and (ii) acceleration commands. The system includes a plurality of vehicle sensors capturing sensor data and an advanced driving-assistance system (ADAS) controller. The ADAS controller, responsive to processing the sensor data, generates ADAS control signals that include at least one selected from the group consisting of (i) lateral movement commands and (ii) acceleration commands. The ADAS controller generates an ADAS status signal indicating a reliability of the generated ADAS control signals. With the ADAS status signal being indicative of the reliability of the generated ADAS control signals being at or above a threshold ADAS reliability level, the vehicular driving assistance system controls the vehicle using the ADAS control signal and, responsive to determining that the ADAS status signal indicates that the reliability of the generated ADAS control signals is below the threshold ADAS reliability level, switches from controlling the vehicle based at least in part on the ADAS control signals to controlling the vehicle based at least in part on the FCM control signals.

These and other objects, advantages, purposes and features of the present invention will become apparent upon review of the following specification in conjunction with the drawings.

DESCRIPTION OF THE PREFERRED EMBODIMENTS

A vehicle vision system and/or driver or driving assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
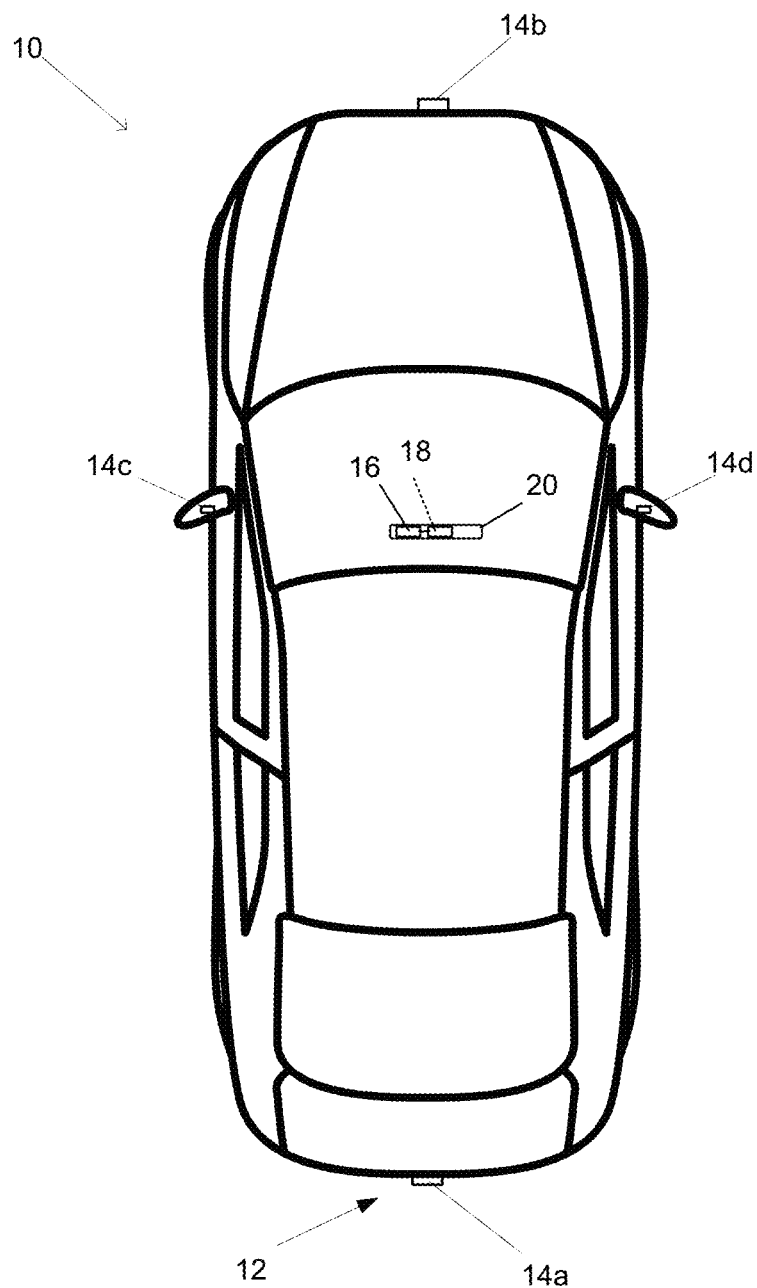
FIG. 1 is a plan view of a vehicle with a driving assistance system that incorporates cameras.

Referring now to the drawings and the illustrative embodiments depicted therein, a vehicle 10 includes an imaging system or vision system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) 18 having electronic circuitry and associated software, with the electronic circuitry including a data processor or image processor that is operable to process image data captured by the camera or cameras, whereby the ECU may detect or determine presence of objects or the like and/or the system provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Advanced driver or driving assistance systems (ADAS) often obtain information regarding the surrounding environment through different sensors such as a front camera module (FCM), radar modules, LiDAR modules, e-Horizon (EH or electronic horizon) modules etc. This information is used by various features (e.g. adaptive cruise control (ACC), lane centering, etc.) to assist the driver while driving a vehicle. These features (e.g., lane centering) can use this information from, for example, the FCM sensor and/or EH, to control lateral movement of the vehicle. For instance, lane centering will steer the vehicle laterally within a driving lane autonomously to keep the vehicle centered in the driving lane.

The ADAS system may include ADAS software executed by a controller (e.g., an ECU or other processing unit). The controller may calculate actuation commands continuously based on sensor inputs. These actuation commands enable lateral and longitudinal control of the vehicle. If there is a hardware failure on the controller, the controller may no longer produce the actuation commands. In such case, the FCM module itself may serve as a backup controller. That is, implementations herein include a system for a vehicle that includes an FCM that, in the event the ADAS controller cannot provide reliable actuation commands, may provide actuation commands in lieu of the ADAS controller.

Figure 2:
FIG. 2 is a schematic view of exemplary components of the driving assistance system of FIG. 1.

Referring now to FIG. 2, the system enables autonomous or semi-autonomous driving of the equipped vehicle. The system may include an FCM that includes a front-facing camera (e.g., mounted at the windshield or at the front of the vehicle) and an FCM controller that transmits information derived from sensor data captured by the camera, such as lane information, object lists, FCM status, etc. The FCM status may be valid when the FCM can clearly see the lanes with high confidence (e.g., visible lane markers and/or road boundaries) and has not experienced any known hardware or software failure. The system includes one or more vehicle sensors. These sensors output sensor data that includes vehicle information such as vehicle speed, yaw rate, steering angle etc. An e-Horizon (EH) module includes a predictive sensor that uses digital maps and high-precision GPS or localization solutions to anticipate the road ahead of the equipped vehicle, effectively extending the horizon beyond what is immediately visible to the camera or other sensors (e.g., radar, LiDAR, etc.). The output of the EH module includes lane information, EH status signals, etc. The EH status indicates whether or not the EH module is outputting accurate lane information.

The system also includes or communicates with a steering system that executes the applied steering (torque or angle) command to laterally control the vehicle. For example, the steering system includes an electric power steering (EPS) or steer-by-wire (SbW) or hydraulic steering system. The system also includes an ADAS controller that receives information from various perception sensors (e.g., the vehicles sensors, FCM, and/or the EH module) and hosts ADAS functions (such as ACC and lane centering) that calculate lateral and longitudinal commands to control the vehicle. It also outputs a controller status to indicate whether the ADAS controller is operating smoothly and without hardware/software failures. For example, the status may include a counter that periodically increments or decrements (e.g., a watchdog timer). Failure by the controller to change to the correct value or at the correct time may indicate a failure status of the controller.

Additionally, the system may include one or more longitudinal actuators. These actuators of the vehicle control longitudinal motion of the vehicle including the brakes and powertrain (e.g., an electric or hybrid or combustion engine). Together, these actuators execute the acceleration commands received from the ADAS controller to increase or decrease the speed of the vehicle. Optionally, a brakes module handles negative acceleration commands and a powertrain module handles non-negative (i.e., positive) acceleration commands.

Figure 3:
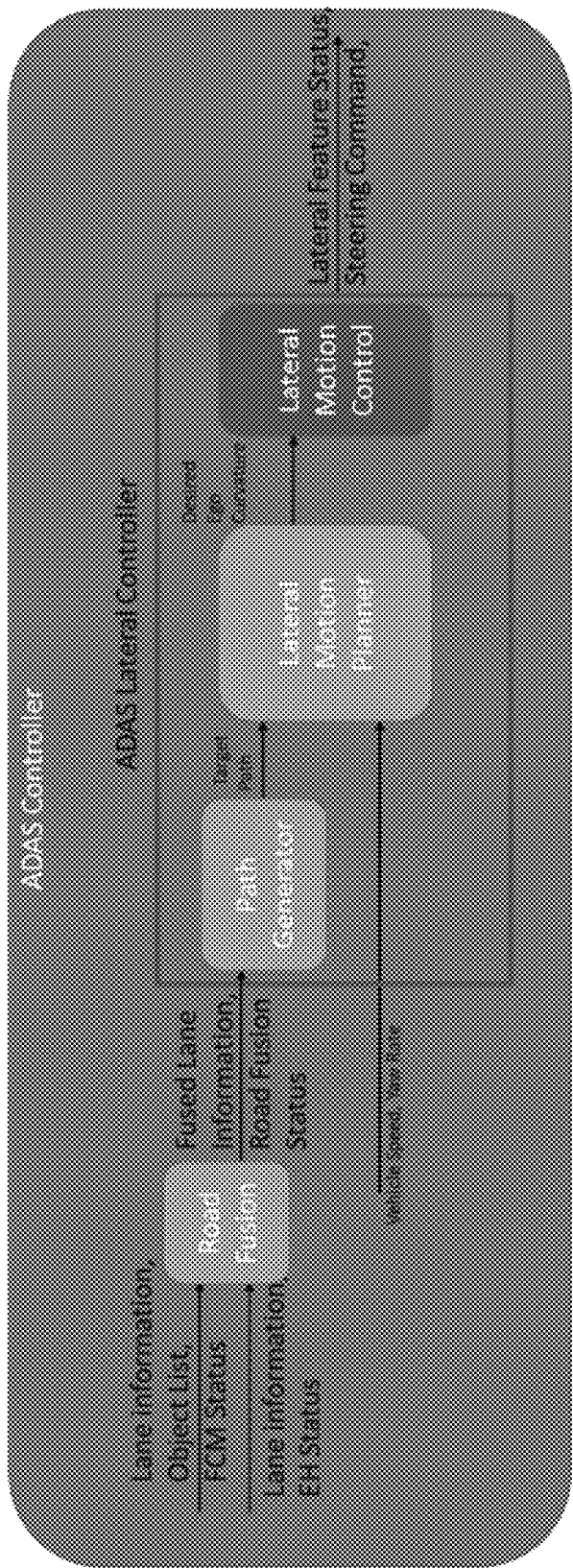
FIG. 3 is a schematic view of components of a controller of the driving assistance system of FIG. 1.

Referring now to FIG. 3, the ADAS controller may calculate the lateral as well as the longitudinal actuation commands for the vehicle. Here, the ADAS lateral controller (i.e., a software component and/or hardware component of the ADAS controller) calculates the steering command. A road fusion module may obtain information from multiple sensors (e.g., the FCM, the EH module, radar sensors, etc.) and combine the information to determine more accurate information than the information from each sensor individually (e.g., a Kalman filter). A path generator module may calculate an optimal target path for the host vehicle to follow using the lane information such as host lane mark polynomials. A lateral motion planner module may, based on the target path, calculate a desired curvature for the vehicle to follow. A lateral motion control module may, using desired curvature and current vehicle states (e.g., vehicle speed, yaw rate, etc.), generate a steering angle or torque command to cause the vehicle to follow the desired trajectory. When lane information is not available to perform the lateral control (e.g., when the FCM cannot detect lane markings), the lateral feature status signal conveys this information.

Together, these modules (i.e., sub-modules of the ADAS controller) generate a steering command that helps to keep the vehicle centered in the host lane. During this time, the driver may or may not have the hands on the steering wheel depending on the Society of Automobile Engineers (SAE) automation level of the ADAS system.

Figure 4:
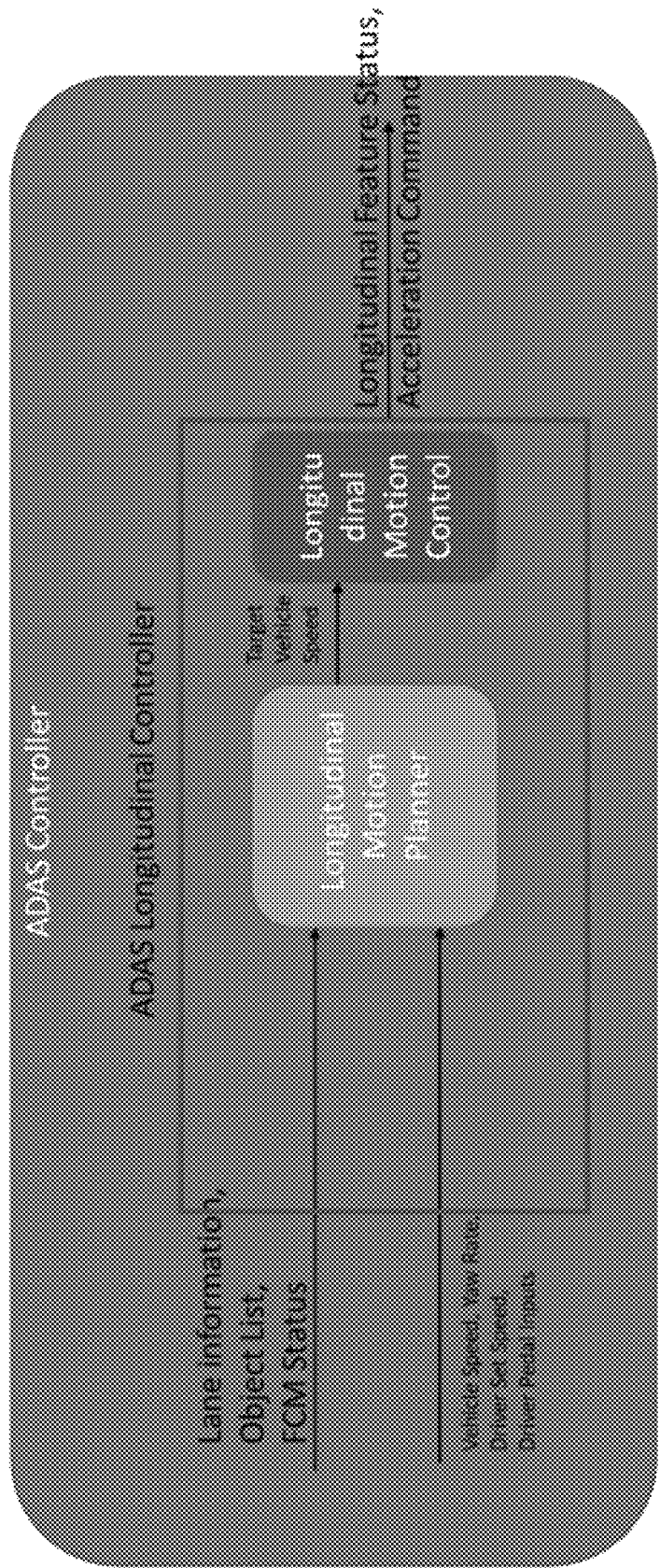
FIG. 4 is a schematic view of a longitudinal controller if the system of FIG. 1.

Referring now to FIG. 4, these modules (e.g., software or hardware components) of the ADAS controller may also produce acceleration commands to increase or decrease the speed of the vehicle. A longitudinal motion planner calculates a desired vehicle speed to follow a set speed requested by the driver or dictated by a speed limit or other road or environmental conditions while keeping a minimum time gap or distance between the equipped vehicle and a target vehicle in front of the equipped vehicle (e.g., using information from the object list) in the same lane or predicted path of the host vehicle. A longitudinal motion control module generates necessary acceleration commands to maintain the desired vehicle speed. These commands may go to, for example, a powertrain module and brakes module directly or another module that controls overall longitudinal actuators of the vehicle.

If the ADAS controller experiences a failure (e.g., a hardware or a software failure), the actuation commands to the actuator may suddenly stop or become unreliable. The controller status sent to the steering system may consist of a status flag and, for example, a rolling counter or other watchdog timer implementation. In a failure scenario, the counter may stop updating or the status command may stop arriving entirely, indicating to the steering system that any steering commands received from the ADAS controller are no longer valid. A similar problem may arise when the FCM has degradation (e.g., due to camera blockage, severe weather, etc.) or hardware failure resulting in loss of accurate lane information. The FCM status may inform the ADAS controller of the degradation, and as a result, the ADAS controller may no longer generate valid actuation commands. In such cases, it is critical to continue to provide at least lateral actuation commands to the vehicle, providing the driver time to react and take control of the vehicle.

Figure 5:
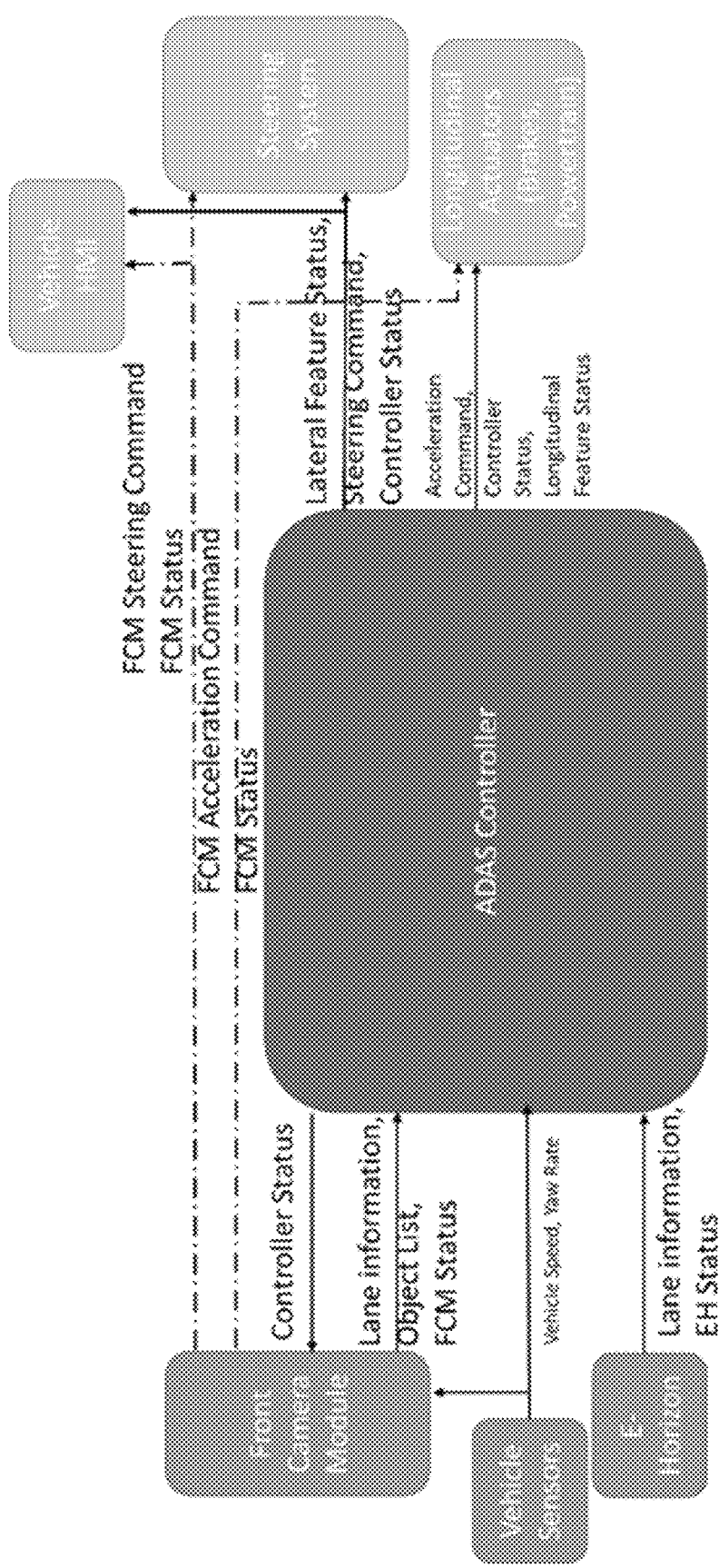
FIG. 5 is a schematic view of the longitudinal controller of FIG. 4 with a redundant design.
Figure 6:
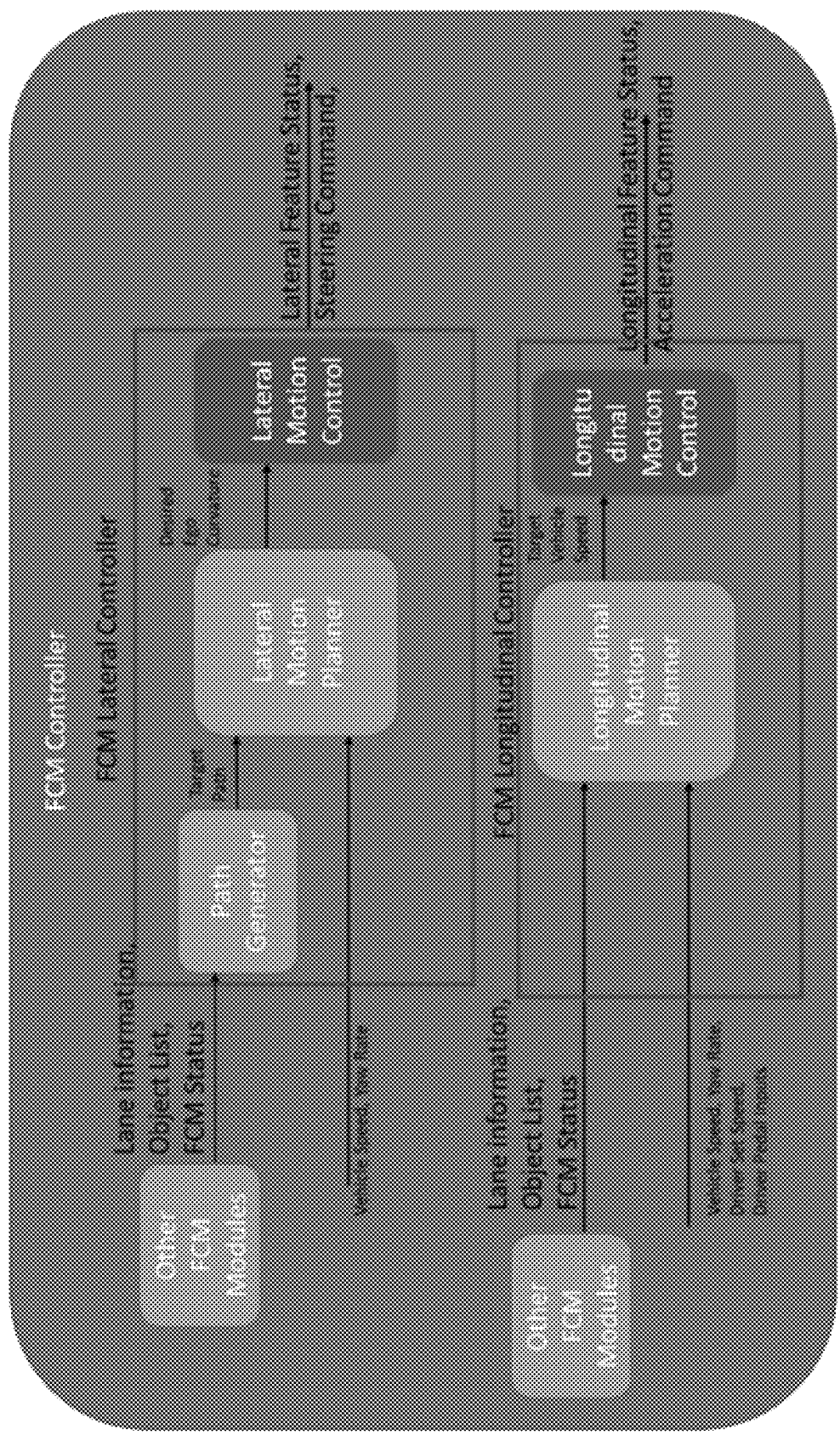
FIG. 6 is a schematic view of lateral and longitudinal controllers of the system of FIG. 1.

Referring now to FIG. 5, in some implementations, the FCM module also simultaneously calculates the lateral and longitudinal commands to perform vehicle motion control (as shown in FIG. 6). For example, if the FCM degrades or fails causing loss of accurate lane information, the FCM status indicates such a situation and the ADAS controller may switch to lane information from, for example, the EH module to continue to perform lateral control of the vehicle. If the FCM does not have the appropriate status signal, the EH output of the EH module may be used exclusively to output the fused lane information via the road fusion module. The road fusion status output by the road fusion module may indicate the number of sources used to generate the output (i.e., the fused lane information). However, the longitudinal control may not be continued in absence of the object list from the FCM. When a radar or LiDAR sensor is available, sensor data from these sensors may be used as a backup.

When the ADAS controller experiences a hardware failure, the steering system may use the controller status to identify the failure condition and in response, switch to FCM steering commands if and when the FCM status is valid. Furthermore, the steering system may perform a smooth transition between steering commands from the ADAS controller and the FCM by limiting the rate of change of steering angle or steering torque commands. That is, when there is a discrepancy between the commands generated by the ADAS controller and the FCM module, the steering system may gradually shift from one command to the other to avoid, for example, sharp jerks or other erratic movements of the vehicle.

When the EH module degrades or fails causing loss of accurate lane information, the EH Status indicates the situation and the ADAS controller may switch to lane information from, for example, the FCM module to continue to control the lateral movement of the vehicle. If the EH module does not output the appropriate status signal, the FCM output may be used exclusively to output the fused lane information by the road fusion module. The road fusion status may indicate the number of sources used to generate the output (i.e., the fused lane information). In this case, the longitudinal control is unaffected by loss of information from the EH module. During any of the failure scenarios described above, the vehicle human-machine interface (HMI) system may communicate the status or failure to the driver and request action such as to take over control of steering or braking/acceleration of the vehicle.

Thus, implementations herein describe an ADAS system that may control lateral or longitudinal motion of the vehicle by generating actuation commands using, for example, an FCM and an ADAS controller. The system includes a steering system that performs lateral motion control of the vehicle by accepting steering commands from the ADAS controller when a status signal from the ADAS controller indicates the ADAS controller is reliable and/or healthy and/or valid (e.g., has a reliability level at or above a threshold reliability level) or alternatively accepting steering commands from an FCM module when the ADAS controller status indicates that the ADAS controller is unreliable or unhealthy or otherwise invalid (e.g., has a reliability level below the threshold reliability level) while the FCM remains healthy or reliable. For example, the ADAS controller may have a reliability level at or above the threshold level when a watchdog timer or other monitoring technique is operational (e.g., while the watchdog timer is still ticking) and the ADAS controller may have a reliability level below the threshold when the watchdog timer is not operational (e.g., when the watchdog timer stops ticking). Similarly, the FCM controller may have a reliability level above the threshold level when a watchdog timer is operational and the FCM controller may have a reliability level below the threshold when the watchdog timer is not operational.

Optionally, a longitudinal actuators system performs longitudinal motion control of the vehicle using acceleration commands from the ADAS controller when the status of the ADAS controller status indicates that the ADAS controller is healthy and using acceleration commands from the FCM module when the ADAS controller status indicates that the ADAS controller is unhealthy. Similarly, a lateral actuators controller may perform lateral motion control of the vehicle using steering commands from the ADAS controller when the status of the ADAS controller status indicates that the ADAS controller is healthy (not compromised) and using steering commands from the FCM module when the ADAS controller status indicates that the ADAS controller is unhealthy (compromised) while the FCM remains healthy. The FCM module may generate the steering commands using a path generator that calculates a target path for the host vehicle to follow using lane information, a lateral motion planner that calculates a desired ego curvature, and a lateral motion control that generates the steering command (steering angle or torque command) for vehicle to follow desired trajectory.

The ADAS controller may generate acceleration commands using an ADAS longitudinal controller and a longitudinal motion planner that identifies a target vehicle (e.g., using information from an object list) in the same lane or predicted path of the host vehicle. The longitudinal motion planner may calculate a desired vehicle speed to follow a set speed requested by the driver while keeping a minimum time gap or distance between the target vehicle and the equipped vehicle. The longitudinal motion control may generate necessary acceleration command to maintain the desired vehicle speed.

Optionally, the FCM module generates an acceleration command using an FCM longitudinal controller and a longitudinal motion planner that identifies a target vehicle (e.g., using information from an object list) in the same lane or predicted path of the host vehicle. The longitudinal motion planner calculates a desired vehicle speed to follow a set speed requested by the driver while keeping a minimum time gap or distance between the target vehicle and the equipped vehicle. The longitudinal motion control generates the necessary acceleration command to maintain the desired vehicle speed.

The ADAS controller (e.g., the ADAS lateral controller) may use lane information from an e-Horizon module when an FCM status is invalid. The vehicle may include a vehicle HMI system that requests the driver to take over steering when the FCM status and/or the ADAS controller status are invalid. The steering system may limit the rate of change of a steering command or an acceleration command when transitioning between different controllers (e.g., from the ADAS controller to the FCM module and vice versa).

For autonomous vehicles suitable for deployment with the system, an occupant of the vehicle may, under particular circumstances, be desired or required to take over operation/control of the vehicle and drive the vehicle so as to avoid potential hazard for as long as the autonomous system relinquishes such control or driving. Such an occupant of the vehicle thus becomes the driver of the autonomous vehicle. As used herein, the term "driver" refers to such an occupant, even when that occupant is not actually driving the vehicle, but is situated in the vehicle so as to be able to take over control and function as the driver of the vehicle when the vehicle control system hands over control to the occupant or driver or when the vehicle control system is not operating in an autonomous or semi-autonomous mode.

Typically an autonomous vehicle would be equipped with a suite of sensors, including multiple machine vision cameras deployed at the front, sides and rear of the vehicle, multiple radar sensors deployed at the front, sides and rear of the vehicle, and/or multiple LiDAR sensors deployed at the front, sides and rear of the vehicle. Typically, such an autonomous vehicle will also have wireless two way communication with other vehicles or infrastructure, such as via a car2car (V2V) or car2x communication system.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or LiDAR sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

The imaging device and control and image processor and any associated illumination source, if applicable, may comprise any suitable components, and may utilize aspects of the cameras (such as various imaging sensors or imaging array sensors or cameras or the like, such as a CMOS imaging array sensor, a CCD sensor or other sensors or the like) and vision systems described in U.S. Pat. Nos. 5,760,962; 5,715,093; 6,922,292; 6,757,109; 6,717,610; 6,590,719; 6,201,642; 5,796,094; 6,559,435; 6,831,261; 6,822,563; 6,946,978; 7,720,580; 8,542,451; 7,965,336; 7,480,149; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2009/036176; WO 2009/046268; WO 2010/099416; WO 2011/028686 and/or WO 2013/016409, and/or U.S. Publication Nos. US 2010-0020170 and/or US-2009-0244361, which are all hereby incorporated herein by reference in their entireties.

Optionally, the camera may comprise a forward viewing camera, such as disposed at a windshield electronics module (WEM) or the like. The forward viewing camera may utilize aspects of the systems described in U.S. Pat. Nos. 9,896,039; 9,871,971; 9,596,387; 9,487,159; 8,256,821; 7,480,149; 6,824,281 and/or 6,690,268, and/or U.S. Publication Nos. US-2020-0039447; US-2015-0327398; US-2015-0015713; US-2014-0160284; US-2014-0226012 and/or US-2009-0295181, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular driving assistance system, the vehicular driving assistance system comprising:
   a front camera module (FCM) comprising a camera disposed at a vehicle equipped with the vehicular driving assistance system, wherein the FCM is disposed behind the windshield of the vehicle and views forward of the vehicle through the windshield, the camera capturing image data;
   wherein the vehicular driving assistance system comprises an image processor for processing image data captured by the camera to detect presence of objects in the field of view of the camera and to determine traffic lane marking information along a road ahead of the vehicle, and wherein the vehicular driving assistance system, responsive to processing the captured image data, generates FCM control signals for the vehicle, and wherein the FCM control signals comprise at least one selected from the group consisting of (i) lateral movement commands and (ii) acceleration commands;
   a plurality of vehicle sensors capturing sensor data;
   an advanced driving-assistance system (ADAS) controller;
   wherein the ADAS controller, responsive to processing the sensor data captured by the plurality of vehicle sensors, generates ADAS control signals, and wherein the ADAS control signals comprise at least one selected from the group consisting of (i) lateral movement commands and (ii) acceleration commands;
   wherein the ADAS controller generates an ADAS status signal indicating a reliability of the generated ADAS control signals;
   wherein, with the ADAS status signal being indicative of the reliability of the generated ADAS control signals being at or above a threshold ADAS reliability level, the vehicular driving assistance system controls the vehicle using the ADAS control signals; and
   wherein the vehicular driving assistance system, responsive to determining that the ADAS status signal indicates that the reliability of the generated ADAS control signals is below the threshold ADAS reliability level, switches from controlling the vehicle based at least in part on the ADAS control signals to controlling the vehicle based at least in part on the FCM control signals.

2. The vehicular driving assistance system of claim 1, wherein the ADAS controller generates the ADAS control signals based at least in part on an output of a predictive sensor that uses map data to anticipate the road ahead of the equipped vehicle.

3. The vehicular driving assistance system of claim 1, wherein the ADAS controller generates the ADAS control signals at least in part by calculating a target path for the equipped vehicle to follow based on the sensor data.

4. The vehicular driving assistance system of claim 1, wherein the ADAS controller generates the ADAS control signals based at least in part on traffic lane information obtained from the FCM.

5. The vehicular driving assistance system of claim 4, wherein the FCM generates an FCM status signal indicating a reliability of the FCM control signals, and wherein the ADAS controller, responsive to determining that the FCM status signal indicates the reliability of the FCM control signals is below a threshold FCM reliability level, obtains traffic lane information from a predictive sensor that uses map data to anticipate the road ahead of the equipped vehicle.

6. The vehicular driving assistance system of claim 5, wherein the FCM status signal comprises a watchdog timer, and wherein the reliability of the FCM control signals is (i) above the threshold FCM reliability level while the watchdog timer is operating and (ii) below the threshold FCM reliability level when the watchdog timer is not operating.

7. The vehicular driving assistance system of claim 1, wherein the vehicular driving assistance system, responsive to determining that the ADAS status signal indicates that the reliability the ADAS control signals is below the threshold ADAS reliability level, notifies an occupant of the vehicle.

8. The vehicular driving assistance system of claim 7, wherein the notification comprises a request for the occupant to take control of the vehicle.

9. The vehicular driving assistance system of claim 1, wherein the vehicular driving assistance system, when switching from controlling the vehicle using the ADAS control signals to controlling the vehicle using the FCM control signals, limits a rate of change between the ADAS control signals and the FCM control signals.

10. The vehicular driving assistance system of claim 1, wherein the vehicular driving assistance system, after switching from the controlling the vehicle using the ADAS control signals to controlling the vehicle using the FCM control signals, and responsive to determining that the ADAS status signal indicates that the reliability of the ADAS control signals is at or above the threshold ADAS reliability level, switches from controlling the vehicle using the FCM control signals to controlling the vehicle using the ADAS control signals.

11. The vehicular driving assistance system of claim 1, wherein the vehicular driving assistance system controls the vehicle by executing a steering command or an acceleration command.

12. The vehicular driving assistance system of claim 1, wherein the ADAS status signal comprises a watchdog timer, and wherein the reliability of the generated ADAS control signals is (i) above the threshold ADAS reliability level while the watchdog timer is operating and (ii) below the threshold ADAS reliability level when the watchdog timer is not operating.

13. The vehicular driving assistance system of claim 1, wherein the FCM comprises the image processor.

14. A vehicular driving assistance system, the vehicular driving assistance system comprising:
   a front camera module (FCM) comprising a camera disposed at a vehicle equipped with the vehicular driving assistance system, wherein the FCM is disposed behind the windshield of the vehicle and views forward of the vehicle through the windshield, the camera capturing image data;
   an FCM controller;
   wherein the FCM controller comprises an image processor for processing image data captured by the camera to determine traffic lane marking information along a road ahead of the vehicle, and wherein the FCM controller, responsive to processing the captured image data, generates FCM control signals for the vehicle, and wherein the FCM control signals comprise (i) lateral movement commands and (ii) acceleration commands;
   a plurality of vehicle sensors capturing sensor data;
   an advanced driving-assistance system (ADAS) controller;

wherein the ADAS controller, responsive to processing the sensor data captured by the plurality of vehicle sensors, generates ADAS control signals, and wherein the ADAS control signals comprise (i) lateral movement commands and (ii) acceleration commands;

wherein the ADAS controller generates an ADAS status signal indicating a reliability of the generated ADAS control signals;

wherein the FCM controller generates an FCM status signal indicating a validity of the generated FCM control signals based at least in part on the determined traffic lane marking information;

wherein, with the ADAS status signal being indicative of the reliability of the generated ADAS control signals being at or above a threshold ADAS reliability level, the vehicular driving assistance system controls the vehicle using the ADAS control signals; and wherein the vehicular driving assistance system, responsive to determining that the ADAS status signal indicates that the reliability of the generated ADAS control signals is below the threshold ADAS reliability level and responsive to determining that the FCM status signal indicates that the FCM control signals are valid, switches from controlling the vehicle based at least in part on the ADAS control signals to controlling the vehicle based at least in part on the FCM control signals.

15. The vehicular driving assistance system of claim 14, wherein the ADAS controller generates the ADAS control signals based at least in part on an output of a predictive sensor that uses map data to anticipate the road ahead of the equipped vehicle.

16. The vehicular driving assistance system of claim 14, wherein the ADAS controller generates the ADAS control signals at least in part by calculating a target path for the equipped vehicle to follow based on the sensor data.

17. The vehicular driving assistance system of claim 14, wherein the ADAS controller generates the ADAS control signals based at least in part on traffic lane information obtained from the FCM.

18. The vehicular driving assistance system of claim 17, wherein the FCM generates an FCM status signal indicating a reliability of the FCM control signals, and wherein the ADAS controller, responsive to determining that the FCM status signal indicates the reliability of the FCM control signals is below a threshold FCM reliability level, obtains traffic lane information from a predictive sensor that uses map data to anticipate the road ahead of the equipped vehicle.

19. A vehicular driving assistance system, the vehicular driving assistance system comprising:

a front camera module (FCM) comprising a camera disposed at a vehicle equipped with the vehicular driving assistance system, wherein the FCM is disposed behind the windshield of the vehicle and views forward of the vehicle through the windshield, the camera capturing image data;

wherein the vehicular driving assistance system comprises an image processor for processing image data captured by the camera to detect presence of objects in the field of view of the camera and to determine traffic lane marking information along a road ahead of the vehicle, and wherein the vehicular driving assistance system, responsive to processing the captured image data, generates FCM control signals for the vehicle, and wherein the FCM control signals comprise at least one selected from the group consisting of (i) lateral movement commands and (ii) acceleration commands;

a plurality of vehicle sensors capturing sensor data, wherein the plurality of vehicle sensors comprises a predictive sensor that uses map data to anticipate the road ahead of the equipped vehicle;

an advanced driving-assistance system (ADAS) controller;

wherein the ADAS controller, responsive to processing the sensor data captured by the plurality of vehicle sensors, generates ADAS control signals, and wherein the ADAS control signals comprise at least one selected from the group consisting of (i) lateral movement commands and (ii) acceleration commands;

wherein the ADAS controller generates an ADAS status signal indicating a reliability of the generated ADAS control signals;

wherein, with the ADAS status signal being indicative of the reliability of the generated ADAS control signals being at or above a threshold ADAS reliability level, the vehicular driving assistance system controls the vehicle using the ADAS control signals;

wherein the vehicular driving assistance system, responsive to determining that the ADAS status signal indicates that the reliability of the generated ADAS control signals is below the threshold ADAS reliability level, switches from controlling the vehicle based at least in part on the ADAS control signals to controlling the vehicle based at least in part on the FCM control signals; and wherein the vehicular driving assistance system, when switching from controlling the vehicle using the ADAS control signals to controlling the vehicle using the FCM control signals, limits a rate of change between the ADAS control signals and the FCM control signals.

20. The vehicular driving assistance system of claim 19, wherein the vehicular driving assistance system, responsive to determining that the ADAS status signal indicates that the reliability the ADAS control signals is below the threshold ADAS reliability level, notifies an occupant of the vehicle.

21. The vehicular driving assistance system of claim 20, wherein the notification comprises a request for the occupant to take control of the vehicle.

22. The vehicular driving assistance system of claim 20, wherein the vehicular driving assistance system controls the vehicle by executing a steering command or an acceleration command.

* * * * *